ly Examiner—William A. Cuchlinski, Jr.

United States Patent [19]

Schwartz et al.

[11] Patent Number: 4,827,770
[45] Date of Patent: May 9, 1989

[54] SIGHT GLASS WITH INNER SURFACE WIPER

[75] Inventors: Ronald S. Schwartz; John K. Kish, both of Shreveport; Jeffery J. Jellum, Bossier City, all of La.; Allen B. Organick, 1343 Ockley St., Shreveport, La. 71108

[73] Assignee: Allen B. Organick, Shreveport, La.

[21] Appl. No.: 77,751

[22] Filed: Jul. 27, 1987

[51] Int. Cl.⁴ .............................................. G01F 23/02
[52] U.S. Cl. ................................... 73/324; 15/250.22
[58] Field of Search ............ 73/324; 15/250.22, 250.18

[56] References Cited

U.S. PATENT DOCUMENTS

| | | | |
|---|---|---|---|
| 2,334,508 | 11/1943 | Purden | 15/250.22 |
| 2,466,437 | 4/1949 | Jurs | 73/324 |
| 2,607,066 | 8/1952 | Morton | 15/250.22 |
| 2,680,874 | 6/1954 | Mitchell | 73/324 |
| 2,888,069 | 5/1959 | Johnson | 15/250.10 |
| 3,058,142 | 10/1962 | Pollock | 15/250.02 |
| 3,089,338 | 5/1963 | Glasgow | 73/324 |
| 3,402,418 | 9/1968 | LeRoy | 73/324 |
| 3,493,804 | 2/1970 | Fennell | 15/250.22 |
| 3,704,481 | 12/1972 | Fennell | 15/250.22 |
| 3,832,750 | 9/1974 | Jarvinen et al. | 15/250.22 |
| 3,887,957 | 6/1975 | Jarvinen et al. | 15/250.16 |
| 3,927,436 | 12/1975 | Inoue et al. | 15/250.17 |
| 4,037,471 | 7/1977 | Okamoto et al. | 73/324 |
| 4,536,064 | 8/1985 | Schindel et al. | 15/250.22 |

FOREIGN PATENT DOCUMENTS

| | | | |
|---|---|---|---|
| 1965540 | 7/1971 | Fed. Rep. of Germany | 15/250.22 |
| 2153132 | 5/1972 | Fed. Rep. of Germany | 15/250.22 |
| 2114392 | 10/1972 | Fed. Rep. of Germany | 15/250.22 |
| 209280 | 11/1966 | Sweden | 73/324 |
| 346143 | 4/1931 | United Kingdom | 15/250.22 |
| 1309742 | 3/1973 | United Kingdom | 15/250.18 |

Primary Examiner—William A. Cuchlinski, Jr.
Assistant Examiner—Thomas B. Will
Attorney, Agent, or Firm—Fleit, Jacobson, Cohn & Price

[57] ABSTRACT

A gear driven and spring biased elongated generally diametrically extending wiper assembly is provided for at least the central area of a circular sight glass. The gear drive enables high torque transfer to the wiper assembly and insures precise movement thereof and the spring biasing of the wiper assembly insures the desired frictional contact of the wiper assembly with the opposing sight glass surface. In addition, the wiper assembly is mounted wholly within a central opening formed in base structure for the associated sight glass assembly to be secured to the exterior of a vessel having a viewing port formed therein.

5 Claims, 4 Drawing Sheets

FIG. 18
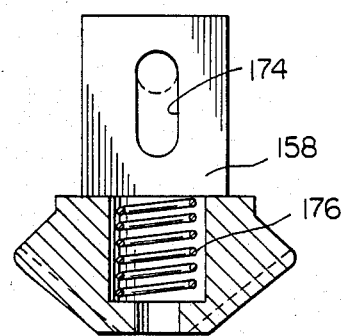
FIG. 20
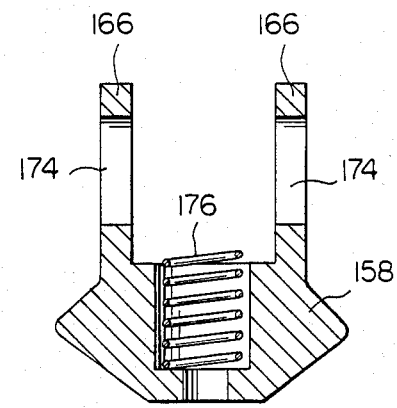
FIG. 19
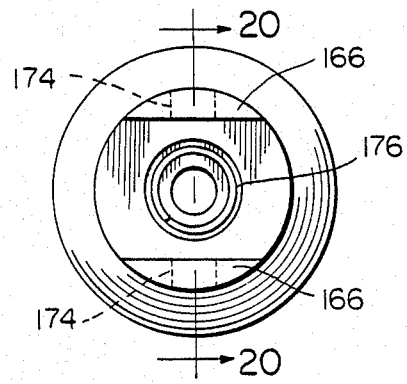
FIG. 21
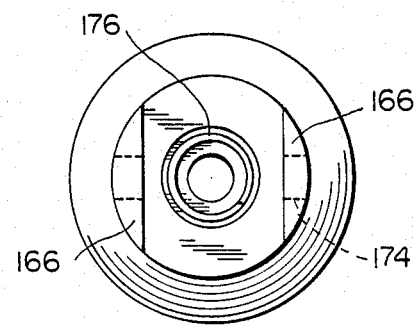
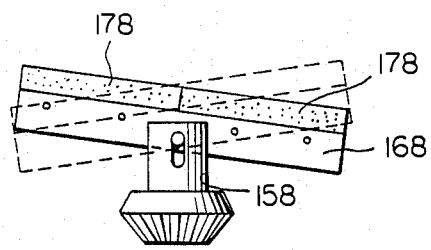
FIG. 22

SIGHT GLASS WITH INNER SURFACE WIPER

BACKGROUND OF THE INVENTION

1. Field of the Invention

It is often desirable to view the interior of a vessel or pipe and, accordingly, such vessels or pipes are conventionally provided with viewing ports relative to which transparent window panels are mounted in sealed relation. Further, window panels utilized for this purpose experience a buildup of foreign material on the inner surfaces reducing the transparency of the window panel and, accordingly, wiper structures heretofore have been devised for intermittently wiping the inner surfaces of the window panels.

The instant invention incorporates a wiping mechanism of this type which is gear driven, mounted solely from the window assembly and rendered extremely effective through novel mounting and driving of the window wiping element.

2. Description of Related Art

Various different forms of wiping mechanisms for sight windows and the like including some of the general structural and operational features of the instant invention heretofore have been known. Examples of such previously known forms of wiping mechanisms are disclosed in U.S. Pat. Nos. 2,334,508, 2,607,066, 2,888,069, 3,058,142, 3,704,481, 3,832,750, 3,887,957 and 3,927,436. However, these previously known forms of wiping mechanisms do not include structural and operational features which combine to provide the effective wiping and precision of operation enjoyed by the wiper of the instant invention.

SUMMARY OF THE INVENTION

The wiper of the instant invention has been specifically designed for use in wiping a sight glass and incorporates, as specifically disclosed hereinafter, a mitre gear driven form and a ring gear driven form each equipped with a yieldingly biased wiper element. The gear driven and yieldingly biased wiper element of each form offers efficient wiping and precision operation heretofore not realized in wiper mechanisms for sight glasses.

The main object of this invention is to provide a sight glass wiping mechanism which will be capable of performing an efficient wiping action upon a sight glass.

Another object of this invention is to provide a sight glass wiping mechanism incorporating a precision drive mechanism therefor whereby operation of the wiping mechanism may be further enhanced, especially over other forms of sight glass mechanisms which include a cable drive encapable of transmitting high torque.

Another important object of this invention is to provide a wiper mechanism for a sight glass wherein maintenance may be readily performed on the wiper mechanism with a minimum of effort.

Still another important object of this invention is to provide a wiper mechanism whereby at least a majority of the wiper mechanism is supported within the confines of the base means by which the associated sight glass is mounted from and attendant vessel.

A final object of this invention to be specifically enumerated herein is to provide a sight glass wiper in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 18 is an enlarged vertical sectional view of the driven miter gear illustated in FIG. 17;

FIG. 19 is an end elevational view of the driven miter gear shown in FIG. 18 as seen from the upper end thereof;

FIG. 20 is a vertical sectional view taken substantially upon the plane indicated by the section line 20—20 of FIG. 19;

FIG. 21 is a top plan view of the miter gear as seen from above FIG. 20; and

FIG. 22 is a side elevational view of the driven miter gear illustrating the manner in which the elongated wiper blade assembly is mounted therefrom for angular displacement relative thereto.

DESCRIPTION OF THE PREFERRED EMBODIMENTS

Figure 1:
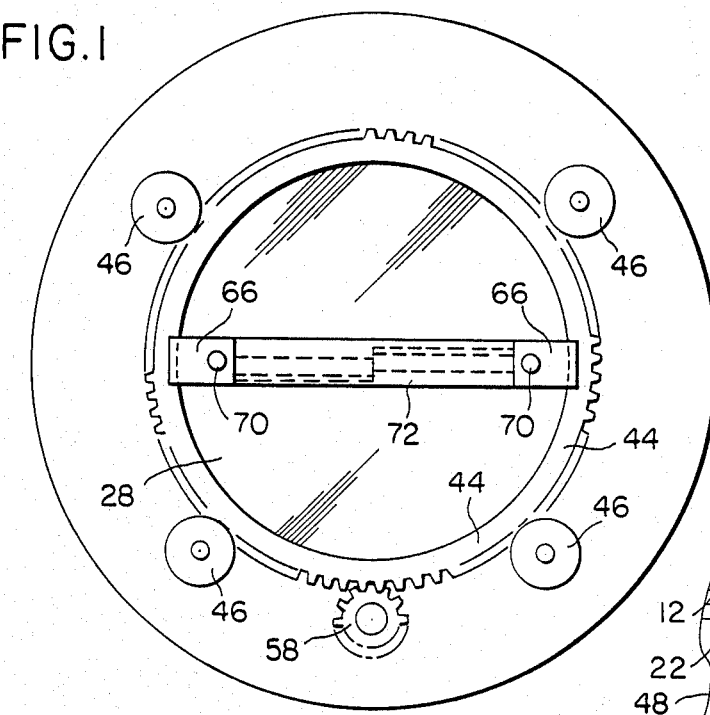
FIG. 1 is an inside elevational view of the ring gear driven form of wiper mechanism in operative association with a sight glass assembly.
Figure 2:
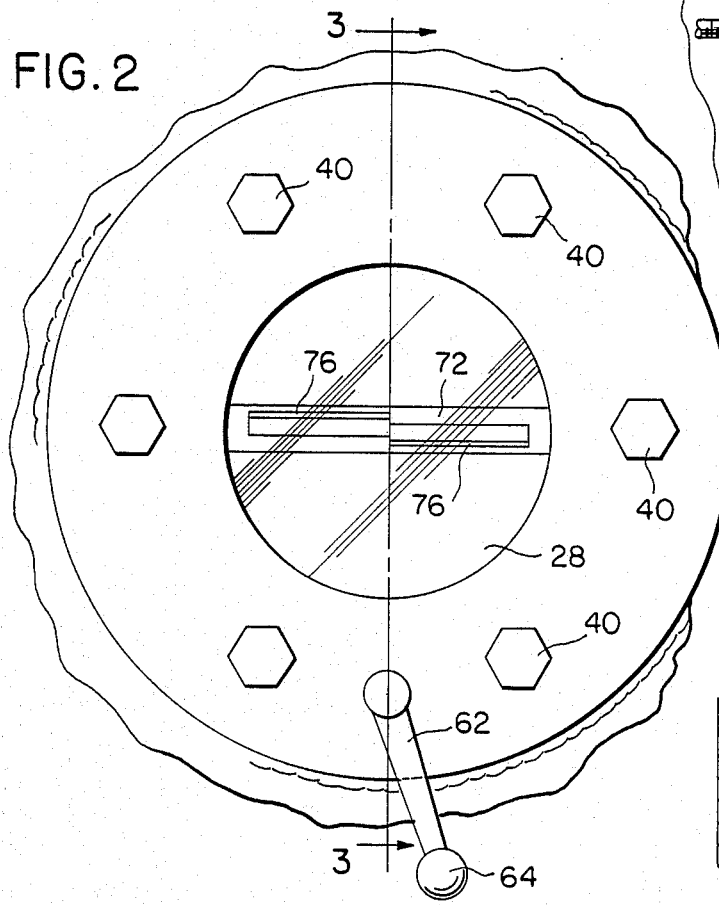
FIG. 2 is an outside elevational view of the sight glass assembly illustrated in FIG. 2 and with the assembly mounted from the wall of the vessel.
Figure 3:
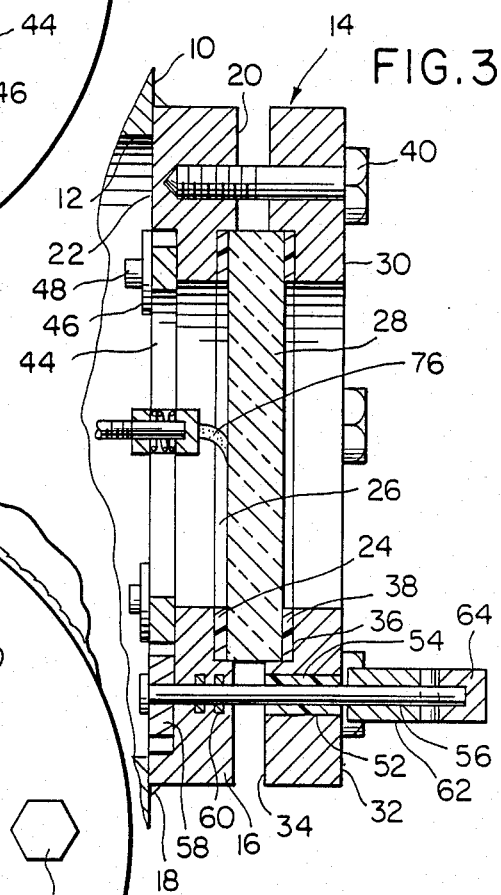
FIG. 3 is a vertical sectional view taken substantially upon the plane indicated by the section line 3—3 of FIG. 2.

Referring now more specifically to FIGS. 1, 2 and 3 of the drawings, a vessel wall is indicated by the reference numeral 10 in FIG. 3 and has a port 12 therein with which a sight glass assembly referred to in general by the reference numeral 14 is operatively associated. The sight glass assembly 14 includes an annular base 16 supported, by welding 18, from the outer surface of the wall 10 about the port 12, the base 16 including outer and inner sides 20 and 22.

The outer side 20 of the base 16 is relieved as at 24 for receiving a seal ring 26 and the inner portion of a sight glass panel 28.

The outer side of the base 16 has an outer annular frame 30 registered therewith including outer and innr sides 32 and 34 and the inner side 34 is relieved as at 36 for receiving an annular seal ring 38 and the outer side of the panel 28, peripherally spaced bolts 40 being used to clamp the seal rings 26 and 38 and the outer peripheral portions of the panel 28 between the base 16 and outer frame 30.

The foregoing comprises a description of a conventional form of sight glass not equipped with a wiper mechanism.

In order to provide a ring gear type of driven wiper mechanism for the sight glass assembly 14, the inner side 22 of the base 16 is provided with an inner peripheral relieved area 42 in which an external ring gear 44 is rotatably received and seated. In addition, a plurality of retaining washers 46 are rotatably supported from the inner side 22 of the base 16 through the utilization of removable fasteners 48 and one peripheral portion of each washer 46 projects inwardly over the relieved area 42 and overlaps the outer toothed periphery of the ring gear 44, the relieved area 42 being of slightly greater axial extent than the ring gear 44 and slightly larger in diameter than the ring gear 44. In addition, corresponding peripheral portions of the base 16 and outer frame 30 include aligned small and large diameter bores 50 and 52 formed therethrough. The bore 52 has a sleeve 54 secured therein and an operating shaft 56 is rotatably received through the sleeve 54 and the bore 50 and has a spur gear 58 mounted on its inner end for rotation therewith. In addition, a pair of sealing O-rings 60 are disposed about the shaft 56 within the bore 50 and the outer end of the shaft 56 has a crank handle 62 mounted thereon equipped with a knob 64 on its free end.

The spur gear 58 is meshed with the outer toothed periphery of the ring gear 44 and, accordingly, upon operation of the crank handle 62 the ring gear 44 may be rotated within the relieved area 42.

Figure 4:
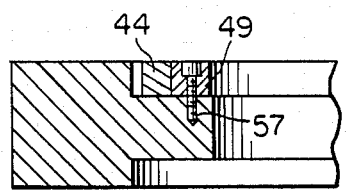
FIG. 4 is a fragmentary enlarged vertical sectional view illustrating a first modified form of ring gear drive incorporating an internal guide ring for the ring gear.
Figure 8:
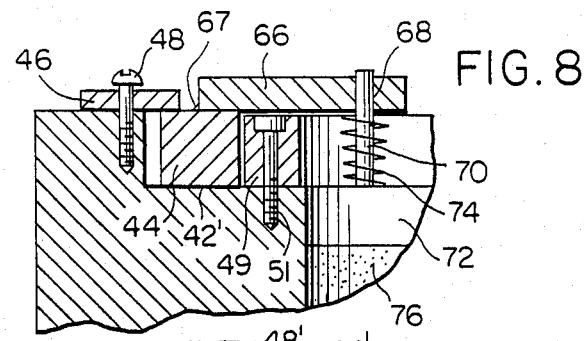
FIG. 8 is a further enlarged sectional view of the first modified form of ring gear drive shown in FIG. 4, but also illustrating the wiper blade support assembly and the retaining washers for the ring gear.

With attention now invited more specifically to FIGS. 4 and 8 of the drawings, a first modified form of ring gear drive is illustrated. In FIG. 8, the ring gear 44 is received in a relieved portion 42' of greater radial extent and an inner guide ring 49 is mounted within the relieved area 42' through the utilization of suitable fasteners 51 for guiding action on the inner periphery of the ring gear 44. Also, as may be seen in FIG. 8, the ring gear 44 includes diametrically opposite mounting lugs 66 mounted therefrom by welding 67. The lugs 66 project radially inwardly from the ring gear 44 and inwardly of the guide ring 49. The radial inner ends of the mounting lugs 66 include bores 68 formed therethrough and mounting pins 70 carried by opposite ends of a channel member 72 extending diametrically of the panel 28 are slidably received through the bores 68, compression springs 74 being disposed about the mounting pins 70 intermediate the channel member 72 and the opposing sides of the mounting lugs 66. The channel member 72 includes opposite end flexible wiper blade elements 76 mounted therein wipingly engaged with the inner surface of the panel 28, see FIG. 3. Accordingly, the only difference between the first modified form of wiper assembly illustrated in FIGS. 4 and 8 from the wiper assembly illustrated in FIGS. 1-3 is that the relieved portion 42' is of greater radial extent than the relieved portion or area 42 and the internal guide ring 49 is provided.

Figure 5:
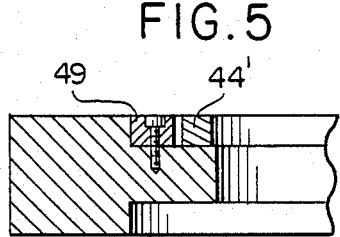
FIG. 5 is an enlarged fragmentary sectional view illustrating a second modified form of ring gear drive incorporating an outside guide ring for the ring gear.
Figure 9:
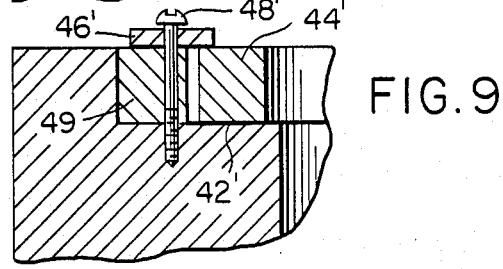
FIG. 9 is an enlarged fragmentary sectional view of the structure illustrated in FIG. 5 and also illustrating the retaining mechanism for the ring gear.

With attention now invited more specifically to FIGS. 5 and 9 of the drawings, there may be seen a second modified form of wiper assembly similar to the first modified form, but which includes an external guide ring 49 which may supported in the radially enlarged relieved area 42' outwardly of a somewhat smaller diameter ring gear 44'. The guide ring 49 is secured in the relieved area 42 through the utilization of fasteners 48. corresponding to the fasteners 48 and washers 46' corresponding to the washers 46. Hence, the fasteners 48' serve a dual function of mounting the guide ring 49 and also axially retaining the ring gear 44' in the relieved area 42'.

Figure 6:
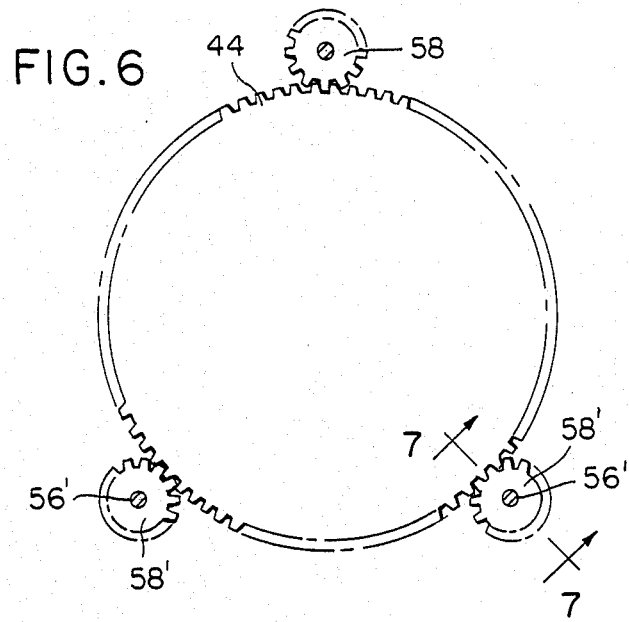
FIG. 6 is a schematic inside plan view of a third modified form of ring gear drive wherein a plurality of spur gears are utilized to guide the ring gear.
Figure 7:
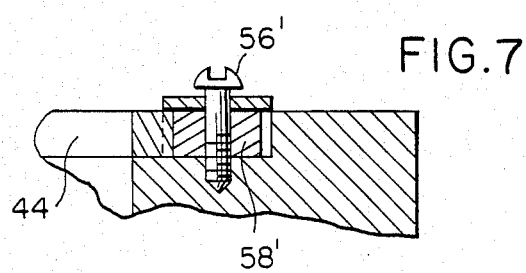
FIG. 7 is a fragmentary enlarged sectional view taken substantially upon the plane indicated by the section line 7—7 of FIG. 6.

With reference now more specifically to FIGS. 6 and 7, in order to provide a third modified form of guiding structure for the ring gear 44, in addition to the driving spur gear 58, a pair of additional idle spur gears 58' are mounted from the base 16 through the utilization of journal fasteners 56'. Of course, the driving spur gear 58 as well as the idle spur gears 58' are received in relieved areas provided therefor in the inner side of the base 16.

Figure 10:
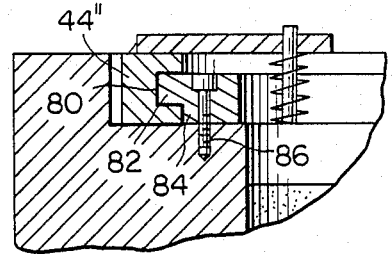
FIG. 10 is a fragmentary sectional view illustrating a fourth modified form of ring gear guiding mechanism.

With attention now invited more specifically to FIG. 10, FIG. 10 illustrates a fourth modified form of ring gear guiding mechanism similar to that illustrated in FIG. 7, but wherein the external ring gear 44" thereof is provided with an internal groove 80 in which a circumferential rib 82 carried by an internal guide ring 84 is guidingly received. The guide ring 84 is mounted through the utilization of a plurality of fasteners 86 corresponding to the fasteners 51 and the rib 82 not only guides the ring gear 44' but also serves the purpose of the washers 46 and fasteners 48.

Figure 11:
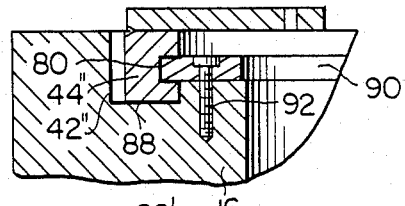
FIG. 11 is a fragmentary sectional view illustrating a fifth form of ring gear guiding mechanism.

With attention now invited more specifically to FIG. 11, yet another form of guiding mechanism for the external ring gear 44" is illustrated. In this instance, a relieved area 42" is provided having an outer axial enlargement 88 in which the ring gear 44" is seated and a guide ring 90 of lesser axial extent than the guide ring 84 is mounted from the base 16 through the utilization of fasterners 92 corresponding to the fasteners 86, the ring gear 90 being loosely received within the internal groove 80 formed in the ring gear 44".

Figure 12:
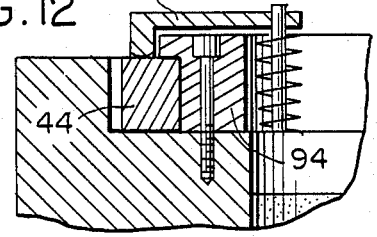
FIG. 12 is a fragmentary sectional view illustrating a sixth modified form of ring gear guiding mechanism.

In FIG. 12 there is illustrated another form of modified external ring gear 44 with which a flanged guide ring 94 is overlappingly engaged, the ring gear 44 of FIG. 11 being provided with L-shaped or offset mounting lugs 66' in order to provide clearance for the flanged ring gear 94.

Figure 13:
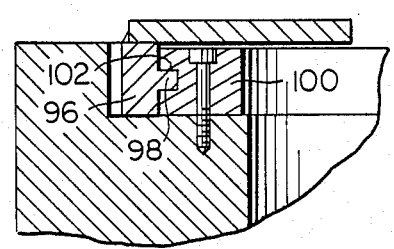
FIG. 13 is a fragmentary sectional view illustrating a seventh modified form of ring gear guiding mechanism.
Figure 16:
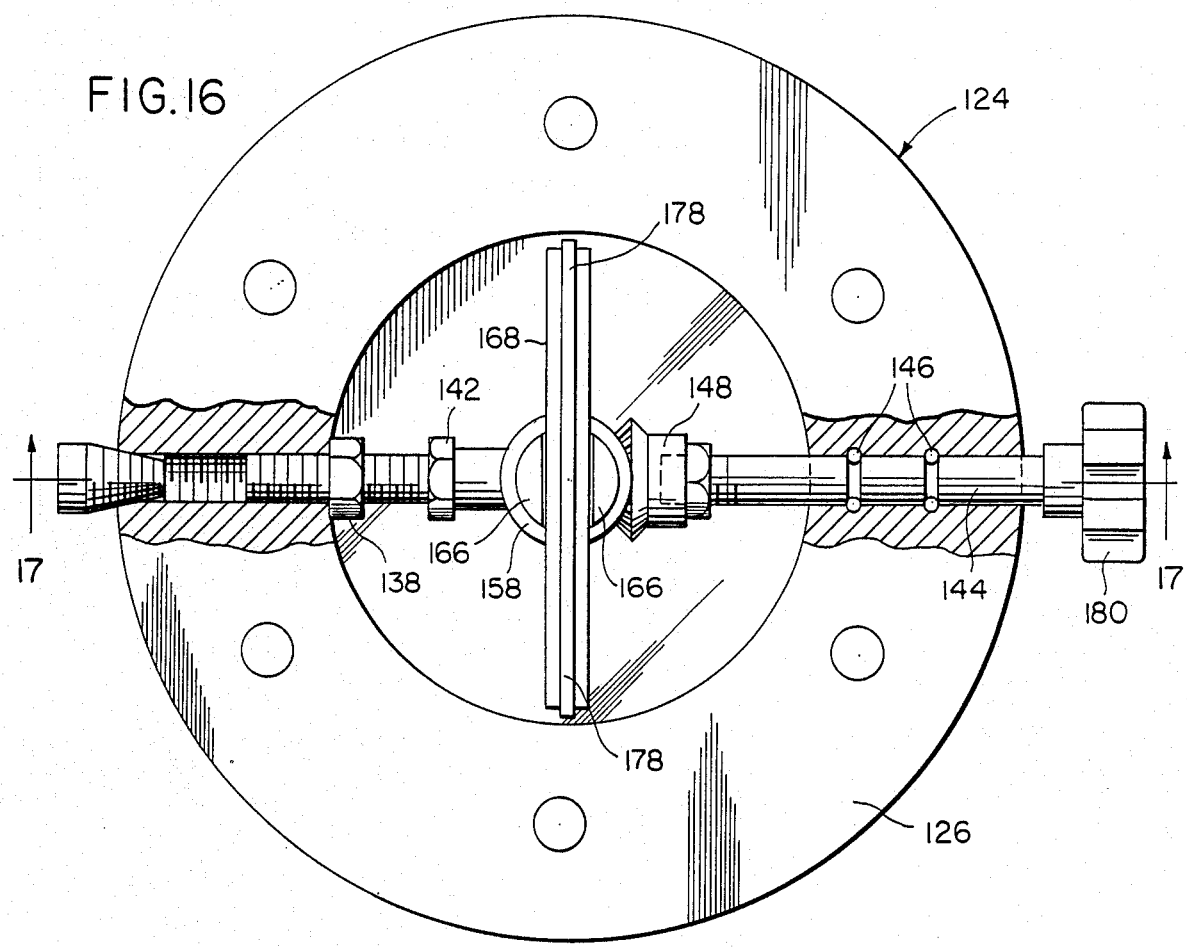
FIG. 16 is an outside elevational view of a sight glass assembly similar to that illustrated in FIGS. 1-3 and having a miter gear driven form of wiper operatively associated therewith, portions of the sight glass assembly being broken away and illustrated in vertical section.

In FIG. 13 a modified form of ring gear 96 is illustrated equipped with an internal circumferential rib 98 and a stationary guide ring 100 is provided with a groove 102 in its outer periphery in which the rib 98 is received. Accordingly, the rib and groove 98 and 102 provide a journalling action for the external ring gear 96 as well as retain the ring gear 96 axially of the associated relieved area of the base in which the ring gear 96 and guide ring 100 are received.

Figure 14:
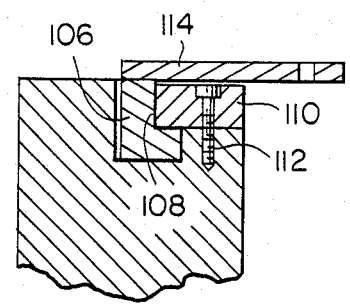
FIG. 14 is a fragmentary sectional view illustrating an eighth modified form of ring gear guiding mechanism.

With attention now invited to FIG. 14, it may be seen that yet another modified form of ring gear 106 is provided and includes an internal relieved area 108 in which the outer periphery of a guide ring 110 is received, the guide ring 110 being secured in place through the utilization of fasteners 112 and the guide ring 106 being provided with diametric lugs 114 corresponding to the mounting lugs 66.

Figure 15:
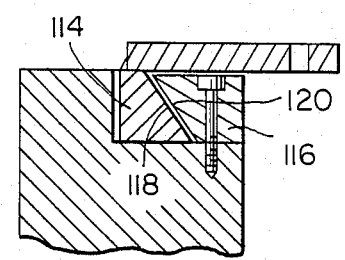
FIG. 15 is a fragmentary sectional view illustrating a ninth modified form of ring gear guiding mechanism.

Finally, with attention invited to FIG. 15, yet another form of external ring gear 114 is provided in conjunction with a stationary guide ring 116, the ring gear 114 and guide ring 116 including oppositely inclined conical opposing bearing surfaces 118 and 120. In this manner, the surfaces 118 and 120 not only function as bearing surfaces, but also to axially retain the ring gear 114.

With attention now invited more specifically to FIGS. 16-22, a second form of sight glass assembly is referred to in general by the reference numeral 124 including a base 126 corresponding to the base 16 and an outer frame 130. A transparent window panel 128 corresponding to the panel 28 is interposed between the base 126 and outer frame 130 and clamped in position through the utilization of bolts (not shown) corresponding to the bolts or fasteners 40.

The base 126 includes diametrically opposite smooth and threaded radial bores 131 and 132 and the outer end of the bore 132 is flared and equipped with pipe threads, a pipe thread equipped plug 134 being threadedly engaged therein.

An externally threaded mounting shaft 136 is adjustably threaded into the radial innermost end of the bore 132 and secured in adjusted position therein by a lock nut 138 threaded on the mounting shaft 136.

The radial innermost end of the mounting shaft 136 is threaded into the adjacent end of a support sleeve 140 and secured in adjusted position through the utilization of a second lock nut 142.

A rotary input shaft 144 is journalled in the bore 131 and includes sealing O-rings 146 thereon within the bore 131 the radial outermost end of the bore 131 being provided with a threaded flared outer end portion 147 for receiving a plug such as the plug 134 in the event the shaft 144 is removed.

The radial innermost end of the shaft 144 has a drive input miter gear 148 threaded thereon and secured in adjusted position through the utilization of a third lock nut 150. The end of the miter gear 148 remote from the shaft 144 has an axial blind bore 152 formed therein in which one end of a journal pin 154 is rotatably received. The other end of the journal pin 154 has a diametric bore 156 formed therethrough and is loosely received in the end of the sleeve 140 remote from the shaft 136.

A driven miter gear 158 is meshed with the miter gear 148 and includes a journalled shaft 160 projecting outwardly therefrom rotatably received through aligned radial bores 162 formed through the sleeve 140. The shaft 160 is fixed relative to the miter gear 158 and is also rotatably received through the diametric bore 156 formed in the journal pin 154.

The end of the miter gear 158 remote from the miter gear 148 is bifurcated to define furcations 166 between which a channel member 168 is shiftably received. The channel 168 includes a central transverse bore 170 formed therethrough in which a transverse pin 172 is frictionally retained and the opposite ends of the pin 172 project through slots 174 formed in the furcations 166. Further, a compression spring 176 is seated in the cavity defined between the furcations 166 and yieldingly biasingly engages the channel member 168 to urge the latter away from the journal pin 154. The channel member 168 supports a pair of half diametric wiper blade elements 178 therefrom corresponding to the blade elements 76 and which engage the inner surface of the transparent panel 180 corresponding to the panel 28. Therefore, it may be seen that the miter gear 148 is journalled from the shaft 144 rotatably received through and sealed relatively to the bore 131 and that the miter gear 158 is journalled by the shaft 160.

Upon rotation of the shaft 144 by the knob 180 (see FIG. 16) mounted on the outer end thereof, the miter gear 148 will be rotated. Of course, rotation of the miter gear 148 causes rotation of the miter gear 150 and angular displacement of the channel member 166 about the center axis of the pin or shaft 160. The spring 176 yieldingly biases the channel member 168 in a direction to cause the wiper blade elements 178 to be frictionally engaged with the inside surface of the transparent panel 180 and in this manner the inner surface of the panel 180 is wiped in a precise manner.

Figure 17:
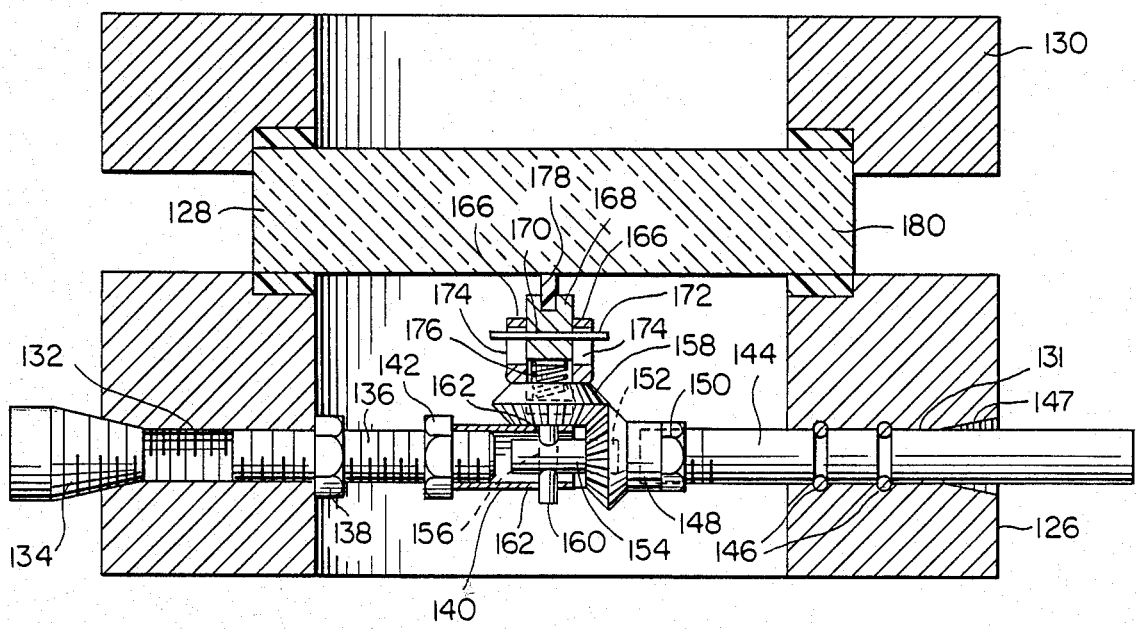
FIG. 17 is a vertical sectional view taken substantially upon the plane indicated by the section line 17—17 of FIG. 16 and with the operating knob for the drive mechanism removed.

Because of the utilization of gear drives in the two major forms of the invention disclosed herein in FIGS. 3 and 17 precise movement of the associated wiper blades may be accomplished. This allows portions of the panels 28 and 180 having excessive buildups of foreign material thereon to be wiped without causing full rotation of the associated wiper blade element supporting channel members. This is contrary to the type of operation which may be accomplished through the utilization of a flexible drive shaft wherein angular displacement of the torque input end of the drive shaft does not necessarily result in the same angular displacement of the output end of the flexible drive shaft.

Furthermore, by rotatably supporting the channel members 72 and 168 as a result of bearing means therefor supported at least from diametrically opposite portions of the bases 16 and 126, a more precise rotational support for the channel members 72 and 168 is afforded.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A sight glass assembly, said assembly including base means for support in seated relation with a vessel wall having a port therein, said base means having a central opening therethough for registry with said port, an outer frame having a central opening therein mounted from and outward of said base means with said openings registered, a sight panel having inner and outer sides facing said base means and outer frame, respectively, said sight panel being disposed between said base means and outer frame in peripherally sealed engagement therewith about said openings, an elongated wiper blade assembly disposed in said opening of said base and engaged with said inner side of said panel for wiping the same, mounting means mounting said wiper blade assembly from said base for rotation relative thereto about an axis passing generally centrally through said openings and disposed centrally intermediate the opposite ends of said blade assembly, said mounting means including means yieldingly biasing opposite ends of said blade assembly along said axis toward said inner side of said panel, said mounting means including driven gear wheel means journalled from said base means for rotation relative thereto about said axis and support means supporting said opposite ends of said blade assembly from said driven gear wheel means for limited shifting relative thereto along said axis and yieldingly biasing said blade assembly, relative to said driven gear wheel means, toward said inner side of said panel, drive gear wheel means journalled from said base means and drivingly meshed with said driven gear wheel means, and rotary torque input means operatively associated with said drive gear wheel means for imparting rotary torque to the drive gear wheel means from exteriorly of said sight glass assembly, said driven gear wheel means comprising a ring gear journalled from the inner side of said base means and said drive gear wheel means comprises a spur gear journalled from the inner said base means, the inner side of said base means including an annular relieved area in which said ring gear is journalled, and peripherally spaced washer retainer members journalled from said inner side of said base means and overlapping adjacent peripheral portions of said ring gear.

2. The sight glass assembly of claim 1 including an inner guide ring mounted in said relieved area inward of the inner periphery of said ring gear.

3. The sight glass assembly of claim 1 including an outer guide ring mounted in said relieved area outward of the outer periphery of said ring gear.

4. The sight glass assembly of claim 1 wherein diametrically opposite portions of said ring gear include radially inwardly projecting mounting lugs, the inner ends of said mounting lugs including bores formed therethrough generally paralleling the axis of rotation of said ring gear and disposed inwardly of the periphery of said central opening in said base means, said blade assembly comprising an elongated blade assembly extending between said mounting lugs between the latter and said sight panel, the opposite ends of said blade assembly including mounting pins projecting outwardly therefrom and slidingly received in the bores formed through said mounting lugs, compression spring means disposed about said pins intermediate said blade assembly and mounting lugs.

5. A sight glass assembly, said assembly including base means for support in seated relation with a vessel wall having a port therein, said base means having a central opening therethrough for registry with said port, an outer frame having a central opening therein mounted from and outward of said base means with said openings registered, a sight panel having inner and outer sides facing said base means and outer frame, respectively, said sight panel being disposed between said base means and outer frame in peripherally sealed engagement therewith about said openings, an elingated wiper blade assembly disposed in said opening of said base and engaged with said inner side of said panel for wiping the same, mounting means mounting said wiper blade assembly from said base for rotation relative thereto about an axis passing generally centrally through said openings and disposed centrally intermediate the opposite ends of said blade assembly, said mounting means including means yieldingly biasing opposite ends of said blade assembly along said axis toward said inner side of said panel, said mounting means including driven gear wheel means journalled from said base means for rotation relative thereto about said axis and support means supporting said opposite ends of said blade assembly from said driven gear wheel means for limited shifting relative thereto along said axis and yieldingly biasing assembly, relative to said drived gear wheel means, toward said inner side of said panel drive gear wheel means journalled from said base means and drivingly meshed with said driven gear wheel means, and rotary torque input means operatively associated with said drive gear wheel means for imparting rotary torque to the drive gear wheel means from exteriorly of said sight glass assembly, said driven gear wheel means comprising a ring gear journalled from the inner side of said base means and said drive gear wheel means comprises a spur gear journalled from the inner said base means, the inner side of said base means including an annular relieved area in which said ring gear is journalled, and peripherally spaced washer retainer members journalled from said inner side of said base means and overlapping adjacent peripheral portions of said ring gear, and a pair of idle spur gears spaced apart about the periphery of said ring gear and from said drive gear wheel means journalled from the inner side of said base means and mesh engaged with the outer periphery of said ring gear, and a washer retaining member coaxial with each of said spur gears journalled from said inner side of said base means and overlapping adjacent peripheral portions of said ring gear.

* * * * *